UNITED STATES PATENT OFFICE.

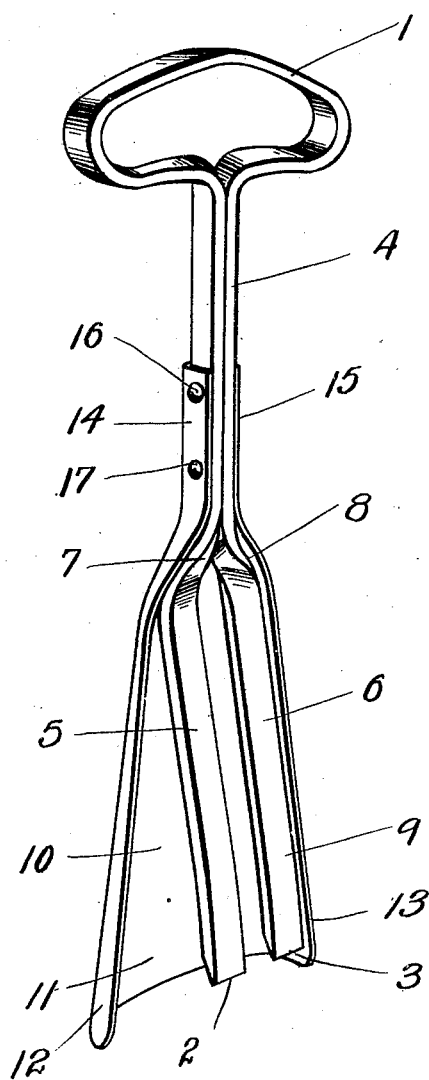
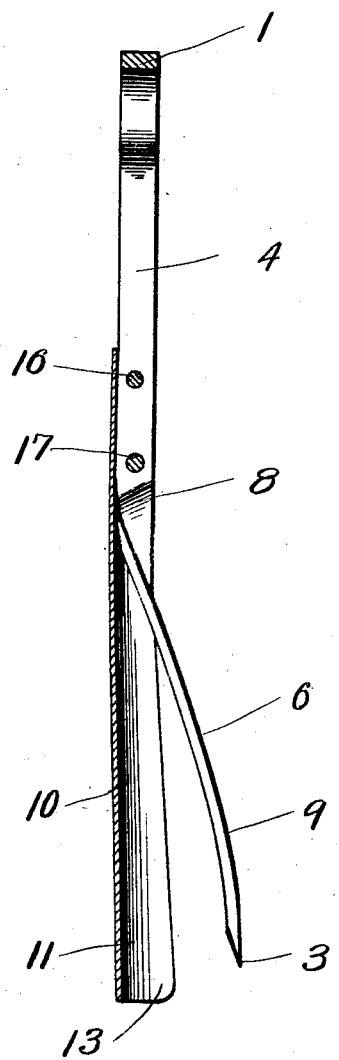

JOHN B. ZORN, OF KANSAS CITY, MISSOURI.

ICE CRACKER.

1,408,677.  Specification of Letters Patent.  Patented Mar. 7, 1922.

Application filed December 9, 1921. Serial No. 521,124.

*To all whom it may concern:*

Be it known that I, JOHN B. ZORN, a citizen of the United States, residing at Kansas City, in the county of Jackson and State of Missouri, have invented certain new and useful Improvements in Ice Crackers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to ice crackers and particularly to means for cracking off small pieces of ice from blocks.

The primary object of the invention is to provide means whereby the ice may be cracked into relatively small pieces by a pronged pick, means being also provided for preventing scattering of the ice over a relatively large area. In other words, the invention contemplates the provision of means whereby the ice may be conveniently cracked into small pieces and whereby an anti-scattering guard can be used in connection with the cracking member.

The cracking member is preferably so constructed that it will break off the ice in substantially uniform pieces, and to this end the invention consists in certain novel parts and combinations of parts, which will be specifically referred to hereinafter, reference being had to the accompanying drawings, in which—

Fig. 1 is a perspective view of an ice pick constructed in accordance with my invention, and Fig. 2 is a vertical, longitudinal, sectional view through the same.

The pick may be conveniently constructed by forming a bar into a handle portion and a tined or cutting portion. The bar is preferably bent intermediate its ends to form a looped handle 1, the free portions intermediate the cutting edges 2 and 3 and the handle 1 being brought together to form a shank 4, terminating in two cutting blades 5 and 6, the ends of which are the cutting edges 2 and 3.

The cutting blades or tines 5 and 6 are spaced apart and are formed by twisting each as at 7 and 8 to present the flat faces of the ends 5 and 6 at right angles to the flat faces of the intermediate portion or shank 4. The tines 5 and 6 are slightly curved, as indicated at 9, (Fig. 2) to curve away from the concavo-convex guard 10, which is in the form of a blade having a flared end 11 with side guard flanges 12 and 13. The inner end of the guard 10 is constricted and formed with side flanges 14 and 15 which may be riveted to the shank 4 by fastening devices or rivets 16 and 17.

When the device is used as an ice cracker, the chisel like points or edges 2 and 3 will crack off the ice and throw it toward the concave face of the guard 10, where it will be prevented from scattering. The depth of the cut will depend upon the curvature of the tines 5 and 6 and the distance they are away from the concave face of the guard 10.

It will be apparent that the device can be inexpensively constructed and easily assembled, since the invention consists of but two pieces, the bar bent to form the handle, shank, and tines, and the guard which is riveted to the shank.

It is also apparent that the guard 10 is spaced from the cutting blades so as to serve as a gauge to determine the thickness of the cut. The amount of ice that will be removed will be equal to the space between the blade proper and the cutting edges of the blades.

What I claim and desire to secure by Letters-Patent is:

1. An ice cracker, comprising a bar bent intermediate its ends to form a handle, the two portions of the bar being brought together to form a shank, and having free ends bent outwardly to provide cutting tines or blades, and a guard fast to the shank and substantially co-extensive in length with the cutting blades.

2. An ice cracker comprising a bar, bent intermediate its ends to form a handle and having portions of the car brought together to form a shank, the ends of the bar being substantially parallel but bent outwardly to form cutting members, the cutting members having sharpened ends, and a guard fastened to the bar and guarding the cutting members.

3. An ice cracker, comprising a handle, a shank, outwardly curved flat blades substantially parallel one with the other and having cutting ends, and a concavo-convex guard substantially co-extensive with the cutting blades and fast to the shank.

4. An ice cracker comprising a bar having its ends twisted to form cutting blades, and the intermediate portion at right angles thereto to form a shank and a handle loop, and a guard connected to the shank and spaced from, but substantially co-extensive with, the cutting blades.

5. An ice cracker comprising a handle, cutting blades extending from the handle, and a combined guard and gauge connected to the handle and spaced from the cutting blades.

In testimony whereof I affix my signature.

JOHN B. ZORN.